United States Patent
Peterson et al.

(10) Patent No.: US 6,760,989 B2
(45) Date of Patent: Jul. 13, 2004

(54) DECORATIVE BADGE AND METHOD OF MAKING

(75) Inventors: Paul A. Peterson, Dayton, OH (US); Theodore J. Hoke, III, Centerville, OH (US); Mark E. Kassman, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 4 days.

(21) Appl. No.: 10/158,078

(22) Filed: May 30, 2002

(65) Prior Publication Data

US 2003/0221347 A1 Dec. 4, 2003

(Under 37 CFR 1.47)

(51) Int. Cl.⁷ ............................................... G09F 21/04
(52) U.S. Cl. ........................................... 40/593; 40/663
(58) Field of Search ........................ 40/593, 591, 663; 280/728.1, 731

(56) References Cited

U.S. PATENT DOCUMENTS

| | | | |
|---|---|---|---|
| 4,139,664 A | * | 2/1979 | Wenrick ........................ 428/31 |
| 4,952,351 A | | 8/1990 | Parker et al. |
| 5,487,557 A | | 1/1996 | Eckhout |
| 5,529,336 A | | 6/1996 | Eckhout |
| 5,678,851 A | | 10/1997 | Saito et al. |
| 5,851,022 A | * | 12/1998 | Yamamoto et al. ....... 280/728.3 |
| 6,047,984 A | * | 4/2000 | Preisler et al. .............. 280/731 |
| 6,105,999 A | * | 8/2000 | Johnson ....................... 40/593 |
| 6,180,207 B1 | | 1/2001 | Preisler et al. |
| 6,209,905 B1 | | 4/2001 | Preisler et al. |
| 6,280,823 B1 | | 8/2001 | Preisler et al. |
| 6,485,050 B1 | | 11/2002 | Simon et al. |

* cited by examiner

Primary Examiner—Gary Hoge
(74) Attorney, Agent, or Firm—Scott A. McBain

(57) ABSTRACT

A badge is disclosed having a metallic emblem having a thickness about 0.01 to about 1 mm, adhesively attached to a mounting frame by an adhesive polymeric resin having a Shore D hardness about 20 to about 90. Also disclosed is a vehicular sub-assembly including a substrate with the badge attached thereto. Methods of making the badge and the sub-assembly are also disclosed.

40 Claims, 3 Drawing Sheets

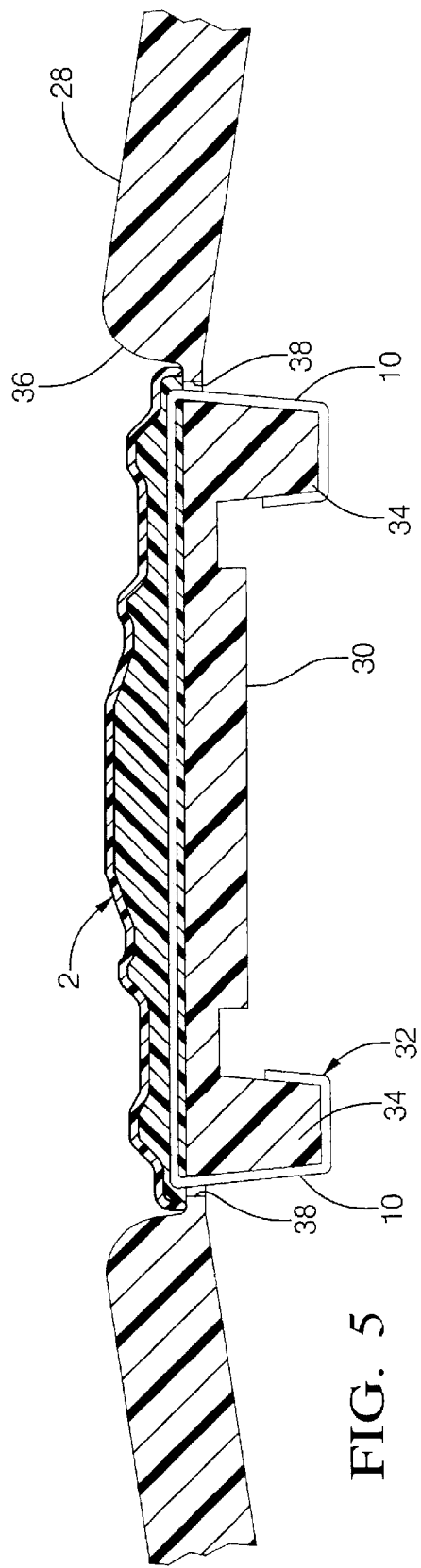
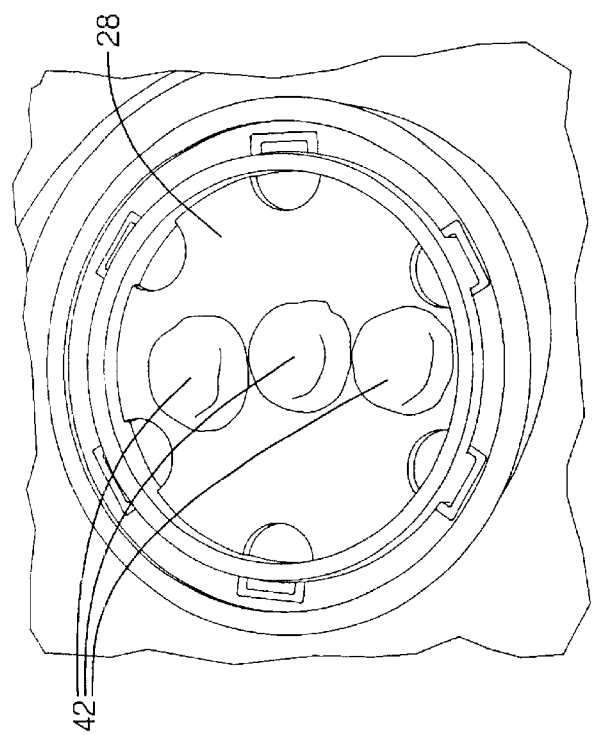
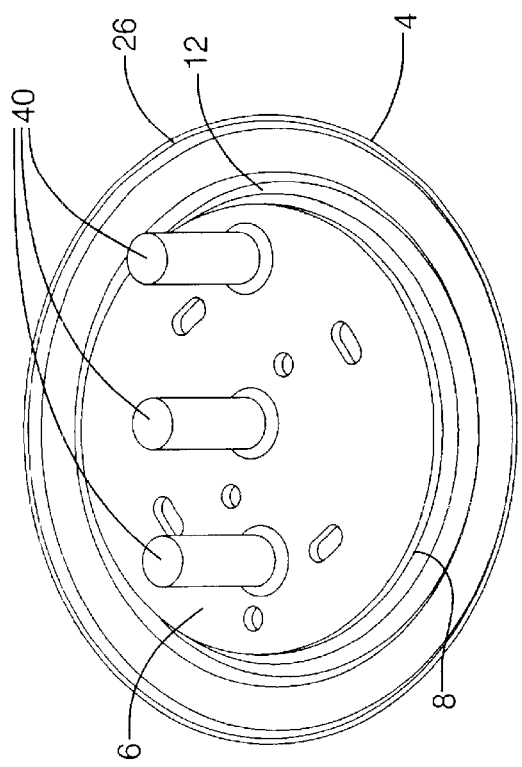
FIG. 5
FIG. 6
FIG. 7

DECORATIVE BADGE AND METHOD OF MAKING

BACKGROUND

Air bag covers used in conjunction with occupant restraint systems often include decorative badges or ornaments attached thereto in the form of a logo or mark representing a vehicle make, model, manufacturer, or the like. These decorative badges are aesthetically pleasing, helping to enhance the overall appearance of the interior of the automotive vehicle.

Stamping the design from a metal foil, typically aluminum, forms the emblem itself. However, stamped aluminum does not provide a level of detail and design consistent with customer expectations. As an alternative, an electroformed emblem, especially one formed from nickel may be used. A nickel emblem provides the level of detail and refinement consistent with customer expectations, however, such an emblem alone formed into a badge does not provide adequate strength for attaching to a substrate, typically an air-bag cover.

An emblem may be incorporated into a badge, in which the emblem is attached to a separate device using injection molded plastics, rigid adhesives, and the like. The attached device functions to mount the emblem as part of the badge unit onto the intended substrate. However, to provide the required level of adhesion between the badge and the substrate, physical manipulation of the mounting device such as bending and crimping is required. This results in deformities within the emblem, which detracts from the aesthetically pleasing appearance.

Accordingly, it is desirable to have an aesthetically pleasing badge that can be attached to an air bag cover. Furthermore, it is desirable to have a badge with an emblem that retains an aesthetically pleasing appearance once attached to an air bag cover, and during use.

SUMMARY

Disclosed herein is a badge having a metallic emblem adhesively attached to a mounting frame by a polymeric resin having a Shore D hardness about 20 to about 90.

Also disclosed is a vehicular sub-assembly including a substrate, and a badge attached to the substrate, wherein the badge has a mounting frame, and a metallic emblem adhesively attached to a mounting frame by a polymeric resin having a Shore D hardness about 20 to about 90.

Further disclosed is a method of producing a badge, including adhesively attaching a metallic emblem having a thickness about 0.01 to about 1 mm to a mounting frame with a polymeric resin, wherein the polymeric resin has a Shore D hardness about 20 to about 90.

In addition, disclosed is a method of producing a vehicular sub-assembly including adhesively attaching a metallic emblem having a thickness about 0.01 to about 1 mm to a mounting frame with a polymeric resin, wherein the polymeric resin has a Shore D hardness about 20 to about 90 to form a badge; and attaching said badge to a substrate to form said vehicular sub-assembly.

BRIEF DESCRIPTION OF THE DRAWINGS

FIG. 5 is a cross-sectional view of the badge of FIG. 1 attached to a substrate;

FIG. 6 is a bottom view of a badge having a plastic disk mounting frame with heat-stake posts; and FIG. 7 is a bottom view away from the metal emblem of the badge of FIG. 6 attached to a substrate by heat staking.

DETAILED DESCRIPTION

Figure 1:
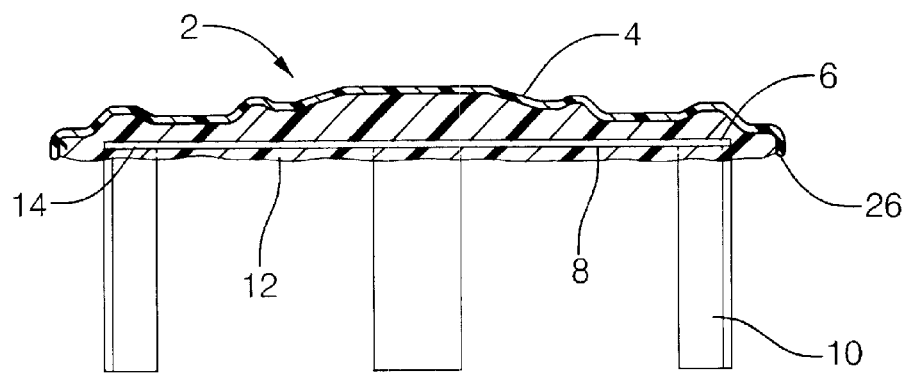
FIG. 1 is a side view of an embodiment of the badge described herein.

It has been discovered that an aesthetically pleasing badge can be formed having a metallic emblem. By metallic emblem, it is meant the emblem resembles metal, however, the emblem need not contain metal. The emblem may be stamped or otherwise pressure formed from aluminum, steel or other suitable metal. Preferably, the emblem is electroformed and contains metal, and is attached to a mounting frame to form a single unit. This unit is then preferably attached to a substrate, typically an airbag cover, without affecting the aesthetic quality of the emblem.

The metallic emblem has a decorative outer surface and a rear inner surface to which the mounting frame is attached to form the badge unit. This mounting frame has appendages for attaching the badge unit to the substrate; preferably the appendages include a plurality of bendable tabs. The unit may be received into a correspondingly sized and shaped outer recessed portion of a front surface of an airbag cover having apertures and/or slots through which the tabs are inserted. The badge unit is preferably fastened to the substrate (e.g., airbag cover) by bending, crimping, and/or heat staking the tabs on the badge unit onto the substrate, to hold the badge in place.

The emblem need only resemble metal, and need not contain metal. However, the front outer surface of the emblem is preferably metal having highly defined features consistent with a pleasing aesthetic appearance. The outer surface may be formed by any method suitable to produce the desired decorative features. When a metal is used, wet and dry processes of forming the emblem may be used. Preferred wet processes include electrochemical deposition and solution electroplating. Preferably, the emblem is formed via a dry film formation method (i.e., a dry process) including vacuum deposition, ion plating, sputtering, ion cluster beam deposition, chemical vapor deposition, or any combination thereof.

Generally, electroforming is the process of producing or copying an object by electrodeposition of a metallic coating within a mold, from which it is afterwards removed so that the finished product (e.g., the emblem) is a hollow shell. Alternatively, a metallic coating may be deposited on the exterior of a nonmetallic solid object.

In one embodiment of this process, a mold is produced from the model to be copied. The mold may be a nonmetallic substance or even a low-melting-point alloy. A suitable substance used for the purpose may be celluloid, wax or stearin, which is poured over the model and is removed when it has set. Gypsum plaster, gutta-percha and plastics are also used for mold making. Plastics, in particular, have the advantage of producing molds that have a long service life (i.e., can be reused a large number of times). Molds useful for producing the emblems herein may include a plurality of parts, depending on the complexity and shape of the model.

Preferably, the surface of the mold is electrically conductive. When a plastic mold is used, it can be made conductive by brushing it with fine graphite powder, or with metallic powder such as copper, suspended in a thin lacquer. Alternatively, very finely divided copper, silver or some other metal may be deposited by chemical reduction or by vaporization in a vacuum. A mold made of a metallic substance is typically provided with a bond-breaking layer before electrolysis, so as to enable the electroformed shell subsequently to be stripped from the mold and not remain adhering to it.

The electrodeposition of metallic coatings done with the aid of direct current is based on electrolysis in an acid or an alkaline salt solution containing the metal to be deposited. The mold is connected to the negative pole and thus forms the cathode; the anode, connected to the positive pole of the current source, usually consists of a plate of the metal to be deposited and is gradually consumed. Various auxiliary techniques are applied, such as the use of internal anodes, masking, and the like to ensure that a uniform and smooth metallic coating is formed. By the addition of various additives known in the art it is possible to enhance the smoothness, fineness and luster of the coating. When a coating of the desired thickness has been attained, the shell is rinsed, removed from the mold and, if necessary, given a finishing treatment.

The preferred deposition method for forming the emblem herein is sputtering deposition. Suitable sputtering deposition processes include DC sputtering, DC magnetron sputtering, RF sputtering, RF magnetron sputtering, ion beam sputtering, electronic cyclotron resonance (ECR) sputtering, or any combination including one of the foregoing sputtering processes. In the sputtering process, argon (Ar) gas is typically used under a pressure of about 0.1 to 10 mTorr. The sputtering gas may also be xenon (Xe), krypton (Kr), neon (Ne), or a mixture including at least one of the foregoing gases. DC plasma generation is in the range of about 1 $mW/cm^2$ to about 100 $W/cm^2$ and/or AC generation is from about 20 Hz to about 10 GHz.

The metals used in a sputtering target must be present in an amount sufficient to produce the desired emblem composition. These metals include beryllium (Be), magnesium (Mg), calcium (Ca), strontium (St), barium (Ba), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), alloys containing these metals can also be used. In addition, silicon (Si), titanium (Ti), vanadium (V), chromium (Cr), manganese (Mn), zinc (Zn), gallium (Ga), germanium (Ge), arsenic (As), selenium (Se), zirconium (Zr), niobium (Nb), molybdenum (Mo), indium (In), tin (Sn), antimony (Sb), tellurium (Te), hafnium (Hf), tantalum (Ta), tungsten (W), rhenium (Re), lead (Pb) and bismuth (Bi); rare earth metals such as scandium (Sc), yttrium (Y) and lanthanides, alkali metals such as lithium (Li), sodium (Na), potassium (K), rubidium (Rb) and cesium (Cs), and alloys containing two or more of these metals are also suitable for use herein. Non-metals such as carbon (C), oxygen (O), nitrogen (N), phosphorus (P), sulfur (S), or a combination including one of the foregoing may also be included in the alloy.

Suitable targets used in the sputtering process include single targets, divided targets of two or more kinds, or a multi-sputtering process simultaneously using two or more targets. In the case of an alloy target, compositions that produce the desired emblem composition are acceptable.

Typical examples of alloy targets include: Mg—Ge, Mg—Ti, Mg—Si, Mg—Ag, Mg—Li, Mg—Al, Mg—Al—Si, Mg—Al—Cu, Mg—Al—Mn—Zn, MgZn—Zr, Mg—Al—Mn, Mg—Al—Li, Mg—Zr—Ag, Mg—Nb, Mg—Ta, Cu—Ni (i.e., white copper), Cu—Ni—Zn (i.e., German silver, nickel silver), Cu—Sn (phosphor bronze), Cu—Zn—Sn (tin brass), Cu—Zn (brass), Cu—Zn—Pb (lead-containing brass), Cu—Sn—Pb (lead-containing bronze), Cu—Al (aluminum bronze), Cu—Si, Cu—Zn—Si (silicon bronze), Cu—Sn—Mn (Mn bronze), Cu—Be—Fe—Ni—Co, Cu—Pb—Fe—Zn, Cu—Al—Fe—Ni—Mn, Cu—Ni—Fe—Mn, Cu—Sn—Pb—Zn, Cu—Be, Cu—Ni—Co—Mn, Ag—Pt, Ag—Pd, Ag—Ru, Ag—Ir, Ag—Os, Ag—Rh, Ag—Ni, Ag—Co, Ag—Fe, Ag—Cu, Ag—Ti, Ag—Cr, Ag—Nb, 22-carat gold, 18-carat gold, 14-carat gold, 18-carat white gold, 14-carat pink gold, 14-carat yellow gold, 10-carat yellow gold, Au—Sn, Au—Sb, Au—Si, Au—Ge, Au—Be, Au—Zn, Au—Ga, Au—Pd, Au—Ge—Ni, Co—Fe, Co—Cu, Co—Ni, Co—Cr, Co—Cr—Fe, Co—Cr—W, austenite stainless steel, martensite stainless steel, ferritic stainless steel, precipitation hardening stainless steel, Cr—Mo steel, Cr steel, Mn steel, Ni steel, carbon steel, Mg—Ni, Mg—Cu, Nickel 200, Nickel 201, Nickel 210, Duranickel 301 ("Z" Nickel alloy), constantan (copper-45% nickel alloy), Monel 400 (monel), R Monel, K Monel (Monel K-500), Monel 411, H Monel, S Monel (Monel 505), Nichrome V (Chromel A), Nichrome (Chromel C), Chromel P, alumel, inconel, Inconel 610, Inconel 625, Inconel 705, Ni-onel, permalloy, and combinations comprising at least one of the foregoing. Preferably, the emblem is formed from a single layer of Ni or a combination comprising Ni.

The thickness of the emblem is about 0.01 mm to about 1.0 mm. Preferably within this range, the thickness is greater than or equal to about 0.2 mm, more preferably greater than or equal to about 0.3 mm. Also within this range, the thickness is less than or equal to about 0.7 mm, more preferably less than or equal to about 0.5 mm. The emblem can also include a plurality of layers in combination.

Attached to the emblem opposite the outer surface is a mounting frame that secures the emblem to a substrate, typically an airbag cover. The mounting frame is preferably formed from a single piece of material. The mounting frame is also of a size and dimension so as to be concealed from sight behind the emblem. The mounting frame preferably includes a substantially planar mounting surface to which the emblem is attached, and a plurality of attachment tabs and/or posts connected to, and outwardly depending away from the substantially planar mounting surface. These tabs and/or posts extend directly from the mounting surface outward, and have a size and thickness sufficient to allow for secure attachment of the badge to the substrate.

In one embodiment, the tabs may be an end portion of a substantially planar mounting surface formed from a plurality of ribs. These ribs being arranged in a "star-like" configuration that extend radially about a center point. To form the tabs, these ribs are arranged at a distance from the center point to be outwardly dependent (e.g., extending away from), essentially perpendicular to the plane of the mounting surface. To provide attachment of the badge to a substrate, these tabs formed from the mounting surface of the mounting frame are positioned to extend through corresponding slots in the substrate, typically an airbag cover or the like.

The tabs, once inserted through the slots in the substrate, are attached by bending or crimping the tabs against the rear surface of the substrate, and may be received into a recessed portion and/or be formed against a crimpwall or other such formation in or on the substrate. The tabs are preferably bent inward, towards the center of the badge, and typically create a substantially constant load on the substrate to which it is attached.

The tabs may be tapered, and are preferably substantially rectangular in shape and have a length measured from the plane of the badge, to the end of the tab sufficient to hold the construct together under operational conditions of about 5 mm to about 50 mm. Of course, and as applications may require, the length of the tabs may be greater than the afore mentioned range. Preferably within this range, the length is greater than or equal to about 10 mm, more preferably greater than or equal to about 15 mm. Also within this range, the tabs are preferably less than or equal to about 40 mm, more preferably less than or equal to about 20 mm.

In addition, the tabs have a width sufficient to hold the construct together under operational conditions, as measured from side to side parallel to the plane of the emblem of about 2 mm to about 10 mm. Of course, and as applications may require, the width of the tabs may be less than or greater than the afore mentioned range. Preferably within this range, the width is greater than or equal to about 3 mm, more preferably greater than or equal to about 5 mm. Also within this range, the width of the tabs is preferably less than or equal to about 8 mm, more preferably less than or equal to about 7 mm.

The tabs have a thickness as measured perpendicular to the width of about 0.2 mm to about 1 mm. Of course, and as applications may require, the thickness of the tabs may be greater than the afore mentioned range. Preferably within this range, the thickness is greater than or equal to about 0.3 mm, more preferably greater than or equal to about 0.4 mm. Also within this range, the tabs have a thickness less than or equal to about 0.8 mm, more preferably less than or equal to about 0.7 mm on average.

In another embodiment, the mounting frame is formed from a shaped piece of plastic, typically an acrylonitrile butadiene styrene plastic (hereinafter ABS plastic), having a plurality of heat stake posts positioned to extend through corresponding slots, apertures, and/or holes in an airbag cover or the like. The emblem is attached to the airbag cover by heat-staking the posts to the underside of the cover. By heat-staking, it is meant a heat-stake device (typically a formed piece of metal that is heated above the melting point of the plastic post) comes into contact with the heat stake posts. The combination of heat and force of its movement melts and deforms the plastic of the heat stake post thereby attaching the emblem to the substrate. The geometry of the tip of the heat stake element determines the final geometry of the heat stake formed.

The heat-stake posts may be tapered, and are preferably substantially cylindrical in shape and have a length measured from the plane of the emblem from which they depend, to the end of the post of about 5 mm to about 50 mm. Of course, and as applications may require, the length of the heat stake posts may be less than or greater than the afore mentioned range. Preferably within this range, the length is greater than or equal to about 10 mm, more preferably greater than or equal to about 15 mm. Also within this range, the length of the post is preferably less than or equal to about 30 mm, more preferably less than or equal to about 20 mm.

This plurality of tabs and/or posts, however formed, also preferably includes at least one locating tab and/or post, wherein the at least one locating tab and/or post is not spaced an equal distance from those tabs and/or posts located on either side of the locating tab and/or post. The use of a locating tab and/or post ensures the correct placement and orientation of the emblem assembly onto the substrate, especially when the badge is circular or near circular in design.

When metal tabs are used, crimping of the tabs should not cause deformation in the outer surface of the badge. To accomplish this, the badge is attached to the mounting frame using a polymeric resin that provides adequate adhesive force between the badge and the mounting frame under a variety of conditions.

Suitable polymeric resins include elastomeric resins, thermoplastic resins, thermoset resins, or combinations including at least one of the foregoing, that provide the required adhesion between the emblem and the mounting frame. As used herein, the term polymeric resin includes both the uncured and cured form of the polymeric resin once applied, set and/or dried. Polymeric resins may be multiple phases, foams, semi-solids solids, gels or liquids. A plurality of polymeric resin layers may also be used in combination to provide the required adhesion between the emblem and the mounting frame.

To be suitable, a polymeric resin must provide an adhesive force (i.e., adhesion) between the emblem and the mounting frame Preferably, the polymeric resin provides support to the emblem as well. Importantly, the polymeric resin must be flexible to allow for attachment of the badge to a substrate, preferably without visible deformation of the emblem, during a variety of circumstances. For example, when the tabs are bent, molded or crimped into place to secure the badge, and/or when the posts are heat-staked to the substrate, the emblem cannot have visible malformations as a result. The polymeric resin must be substantially non-reactive with the materials contained within the emblem or the mounting frame, and must retain adhesion between the emblem and the mounting frame from about $-40°$ C., to about $85°$ C.

To provide a suitable level of support and flexibility, the polymeric resin has a Shore D durometer hardness of about 20 to about 90. Preferably within this range, the Shore D hardness is greater than or equal to about 30, more preferably greater than or equal to about 50. Also within this range, the polymeric resin has a Shore D durometer hardness preferably less than or equal to about 80, more preferably less than or equal to about 65. As used herein, "Shore D durometer hardness" is measured generally in accordance with ASTM D-2240. The flexural modulus is about 1000 psi to about 2200 psi. Preferably within this range, the flexural modulus is greater than or equal to about 1100, more preferably greater than or equal to about 1200 psi. Also within this range, the polymeric resin has a flexural modulus preferably less than or equal to about 2100, more preferably less than or equal to about 2000 psi. In addition, to improve adhesion of the badge to the substrate, the total mass of the badge is preferably minimized through selection of the materials from which the badge is formed and the amounts used.

Suitable elastomeric resins include: acrylates, butyls, chlorosulfonated polyethylenes, fluorocarbons, fluorosilicones, polysulfides, polyurethanes, neoprenes, nitriles, silicones, styrene-butadienes, and combinations comprising at least one of the foregoing. Suitable thermoplastic resins include: acetates, acrylics, cellulosics, chlorinated polyethers, fluorocarbons, polyamides, polycarbonates, polyethylenes, polypropylenes, polyimides, polyphenylene oxides, polystyrenes, polysulfones, vinyls, and combinations comprising at least one of the foregoing.

Suitable thermoset resins include: alkyds, diallyl phthalates, epoxies, melamines, phenolics, polyesters, urethanes, silicones, and combinations comprising at least one of the foregoing.

In particular, suitable polymeric resins include olefins, such as, for example, ethylene/propylene rubber (EPM), ethylene/propylene diene monomer terpolymer (EPDM), styrenic block copolymers such as styrene-butadiene (SB), styrene-isoprene (SI), styrene-butadiene-styrene (SBS), styrene-isoprene-styrene (SIS), styrene-ethylene/butene-styrene (SEBS) block copolymers, copolymers of styrene and acrylonitrile, methacrylonitrile, maleic anhydride, alpha-methyl styrene, elastomers such as polyisoprene, polybutadiene, natural rubbers, ethylene/propylene rubbers, ethylene/propylene diene (EPDM) rubbers, styrene/butadiene rubbers, polyurethanes, vinyl halide homopolymers and copolymers, including vinyl chloride, vinylidene chloride and chlorinated derivatives therefrom, so-called "engineering thermoplastics" such as, for example, poly(methylmethacrylate) (PMMA), cellulosics, nylons, poly(esters), poly(acetals); poly(amides),the poly(acrylate), aromatic polyesters, poly(carbonate), poly(butylene) and polybutylene, polyethylene terephthalates, poly(esters); and combinations comprising at least one of the foregoing.

In addition, or instead of the following thermoplastics, one or more thermoset polymeric materials may be utilized. Thermoset polymeric materials include, but are not limited to, urethanes, polyurethanes, metallocenes, diene rubbers such as trans polyisoprene EPDM or EPM. Urethanes are more preferred thermoset resins for use herein, including those commercially available under the trade name AMDUR®, available from Anderson Development Company (Adrian Mich.). These include polyester based liquid isocyanates-terminated pre-polymers obtained through curing with 4,4'-methylene-bis (orthochloraniline), sold under the tradename ANDUR® 9APLM and the like.

Suitable urethanes include, for example, those urethanes produced by an addition reaction between an epoxy compound and an isocyanate compound in the presence of a catalyst to form a cyclic oxazolidone, followed by curing with an amine, an acid anhydride, a phenol or the like to yield a cured polyurethane. The epoxy compound may have alcoholic hydroxyl groups and epoxy groups, and may be used either alone or in admixture with an epoxy compound free from alcoholic hydroxyl groups. Examples of suitable compounds having both alcoholic hydroxyl groups and epoxy groups include diglycidyl ethers having alcoholic hydroxyl groups obtained by the reaction of epichlorohydrin and Bisphenol A, Bisphenol F or hydrogenated Bisphenol A; diglycidyl ethers having alcoholic hydroxyl groups obtained by the reaction of beta-methyl-substituted epichlorohydrin and Bisphenol A; diglycidyl ethers having alcoholic hydroxyl groups obtained by the reaction of epichlorohydrin and oxybenzoic acid; compounds obtained by partially converting the hydroxyl groups of polyol compounds, such as propylene triol, butylene triol and the like, to glycidyl ether; brominated products of the above-mentioned epoxy compounds; and the like.

Examples of suitable epoxy compounds free from alcoholic hydroxyl groups include polyglycidyl ethers of phenol or cresol; diglycidyl ethers of polyhydric phenols such as resorcinol, hydroquinone, catechol and the like; diglycidyl ethers of aromatic dicarboxylic acids; vinylcyclohexene diepoxide; dicyclopentadiene diepoxide; diglycidyl methylhydantoin; triglycidyl isocyanurate; diglycidyl ethers free from alcoholic hydroxyl group obtained by the reaction between epichlorohydrin and Bisphenol A, Bisphenol F, hydrogenated Bisphenol A or oxybenzoic acid; diglycidyl ethers free from alcoholic hydroxyl group obtained by the reactions between beta-methyl-substituted epichlorohydrin and Bisphenol A; brominated products of the above-mentioned epoxy compounds; and the like.

Examples of isocyanate compounds suitable for use herein include methane diisocyanate, ethane-1,2-diisocyanate, butane-1,1-diisocyanate, butane-1,2-diisocyanate, butane-1,4-diisocyanate, propane-1,3-diisocyanate, trans-vinylene diisocyanate, 2-butene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilane diisocyanate, diphenylsilane diisocyanate, omega, omega'-1,3-dimethylbenzene diisocyanate, omega, omega'-1,4-dimethylbenzene diisocyanate, omega, omega'-1,3-dimethylcyclohexane diisocyanate, omega, omega'-1,4-dimethylcyclohexane diisocyanate, omega, omega'-1,3-dimethylnaphthalene diisocyanate omega, omega'-1,4-dimethylnaphthalene diisocyanate, omega, omega'-1,5-dimethylnaphthalene diisocyanate, cyclohexane-1,3-diisocyanate, cyclohexane-1,4-diisocyanate, dicyclohexylmethane-4,4'-diisocyanate, 1,3-phenylene diisocyanate, 1,4-phenylene diisocyanate, 2,4-tolylene diisocyanate, 2,5-tolylene diisocyanate, 2,6-tolylene diisocyanate, 3,5-tolylene diisocyanate, diphenyl ether-4,4'-diisocyanate, diphenyl ether-2,4-diisocyanate, napthalene-1,4-diisocyanate, naphthalene-1,5-diisocyanate, biphenyl-4,4'-diisocyanate, 3,3'-dimethylbiphenyl-4,4'-diisocyanate, 2,3-dimethoxybiphenyl-4,4'-diisocyanate, diphenylmethane-4,4'-diisocyanate, 3,3'-dimethoxydiphenylmethane-4,4'-diisocyanate, 4,4'-dimethoxydiphenylmethane-3,3'-diisocyanate, diphenyl sulfide-4,4'-diisocyanate, diphenylsulfone-4,4'-diisocyanate, polymethylenepolyphenyl isocyanate, triphenylmethane triisocyanate, triphenyl isocyanate, tris(4-phenyl isocyanate thiophosphate), 3,3',4,4'-diphenylmethane tetraisocyanate and the like, as well as polymers such as dimer, trimer, tetramer, pentamer and the like.

Other suitable isocyanates include trimers of 2,4-tolylene diisocyanate, 2,5-tolylene diisocyanate, 2,6-tolylene diisocyanate and 3,5-tolylene diisocyanate, a trimer of hexane-1,6-diisocyanate, a copolymer of 2,4-tolylene, 2,5-tolylene, 2,6-tolylene or 3,5-tolylene diisocyanate and hexane-1,6-diisocyanate, and the like.

Examples of the amine compound suitable for use herein include aliphatic amines such as, for example, ethylenediamine, propylenediamine, diethylenetriamine, iminobispropylamine, triethylenetetramine, tetraethylenepentamine, diethylaminopropylamine, aminoethylethanolamine, m-xylylenediamine, tetrachloro-p-xylylenediamine, cyanoethylated diethylenetriamine and the like; alicyclic amines such as methanediamine, N-aminoethylpiperazine, 1,3-diaminocyclohexane, isophoronediamine and the like; aromatic amines such as o-phenylenediamine, m-phenylenediamine, p-phenylenediamine, diaminodiphenyl ether, diaminodiphenyl sulfone, diaminodiphenylmethane, benzidine, 4,4'-bis (otoluidine), 4,4'-thiodianiline, dianisidine, methylenebis(o-chloroaniline), 2,4-toluenediamine, bis(3,4-diaminophenyl) sulfone, diaminoditolylsulfone, 2,6-diaminopyridine, 4-chloro-o-phenylenediamine, 4-methoxy-6-methyl-mphenylenediamine, m-aminobenzylamine and the like; secondary and tertiary amines such as piperidine, pyrrolidine, morpholine, N-methylmorpholine, pyridine, benzyldimethylamine, tris(dimethylaminomethyl)phenol and the like; polyamide having terminal amino group produced from linolenic acid dimer and ethylenediamine or diethylenetriamine; dicyandiamide; boron trifluoride-amine complex; imidazole compounds; and the like.

Suitable carboxylic acid anhydrides include phthalic anhydride, itaconic anhydride, succinic anhydride, alkenic anhydride, dodecenylsuccinic anhydride, tricarballylic anhydride, linoleic acid adduct of maleic anhydride, chlorendic anhydride, maleic anhydride-vinyl ether copolymer, maleic anhydride-styrene copolymer, nadic anhydride, methylnadic anhydride, hexahydrophthalic anhydride, methylhexahydrophthalic anhydride, tetrahydrophthalic anhydride, methyltetrahydrophthalic anhydride, trimellitic anhydride, pyromellitic anhydride, cyclopentanetetracarboxylic anhydride, benzophenone-tetracarboxylic anhydride, benzotetracarboxylic anhydride, ethylene glycol-bis(trimellitate), glycerin-tris(trimellitate) and the like.

Suitable phenol compounds include phenol itself, cresol, xylenol, trimethylphenol, allylphenol, alkenylphenol, resorcinol, hydroquinone, pyrocatechol, pyrogallol or the like with formaldehyde, paraformaldehyde or the like in the presence of an acid catalyst. Also included are polyvinylphenol compounds having monomeric unit of o-vinylphenol, m-vinylphenol, pvinylphenol, and the like.

Suitable bisimide compounds include N,N'-ethylenebismaleimide, N,N'-hexamethylene-bismaleimide, N,N'-m-phenylenebismaleimide, N,N'-p-phenylene-bismaleimide, N,N'-4,4'-diphenylmethanebismaleimide, NN'-4,4'-diphenylether-bismaleimide, N,N'-4,4'-diphenylsulfone-bismaleimide, N,N'-4,4'-dichlorohexylmethane-bismaleimide, N,N'-alpha, alpha'-4,4'-dimethylenecyclohexane-bismaleimide, N,N'-mxylylene-bismaleimide, N,N'-diphenylcyclohexane-bismaleimide and the like.

Suitable catalyst include quaternary ammonium salts such as cetyltrimethylammonium bromide, cetyltrimethylammonium chloride, dodecyltrimethylammonium iodide, trimethyldodecylammonium iodide, trimethyldodecylammonium chloride and the like; metal halides such as lithium chloride, tin chloride, iron chloride, zinc chloride, aluminum chloride and the like; metal alkoxides and phenoxides such as lithium butoxide, potassium butoxide, aluminum isopropoxide, aluminum phenoxide, calcium ethoxide, magnesium ethoxide and the like; cobalt naphthenate; organometallic compounds such as tetrabutyltin, trimethyltin hydroxide, dimethyltin dichloride, dibutyltin dilaurate and the like; and imidazole compounds such as 2-methylimidazole, 2-ethylimidazole, 2-phenylimidazole, 2-ethyl-4-methylimidazole, 2-phenyl-4-methylimidazole, 1-benzyl-2-methylimidazole, 2-isopropylimidazole, 1-cyanoethyl-2-methylimidazole, 1-cyanoethyl-2-ethyl-4-methylimidazole, 1-cyanoethyl-2-isopropylimidazole, 1-cyanoethyl-2-phenylimidazole, 2-undecylimidazole, 2-heptadecylimidazole, 1-cyanoethyl-2-undecylimidazole, 1-azine-2-methylimidazole, 1-azine-2-ethyl-4-methylimidazole, 1-azine-2-undecylimidazole and the like. Further, various amines such as trimethylamine, triethylamine, benzyldimethylamine, tris(dimethylaminomethyl)phenol, tetramethylbutanediamine, N-methylmorpholine, N-ethylmorpholine, triethylenediamine and the like.

It is preferred that thermoset materials be crosslinked. Crosslinking may be achieved by chemical crosslinking and/or initiated by free radicals generated from peroxides, gamma or election beam radiation. Also, the polymeric resin can be solid or foamed, it can be unitary or can have two or more layers.

Polybutadiene, preferably free radical initiator cured or sulfur cured, may be found useful because it imparts support to the emblem. The preferred molecular weight of the polybutadiene is from about 50,000 to about 500,000 Daltons. Also preferred are polymeric compositions that include cis-1-4-polybutadiene, or a blend of cis-1-4-polybutadiene with other elastomers such as crosslinked natural rubber, EPDM, metallocene catalyzed polyolefin, or combinations comprising at least one of the foregoing.

Polybutadiene may also be crosslinked with an unsaturated carboxylic acid co-crosslinking agent. The unsaturated carboxylic acid component of the binder composition typically is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, preferably zinc oxide.

Unsaturated carboxylic acids include acrylic acid, methacrylic acid, itaconic acid, crotonic acid, sorbic acid, and the like, and mixtures thereof. Usually, from about 5 to about 40, and preferably from about 15 to about 30 parts by weight of the carboxylic acid salt, such as zinc diacrylate, is included in the composition. The unsaturated carboxylic acids and metal salts thereof are generally soluble in the elastomeric base, or are readily dispersible.

The free radical initiator included in the polymeric resin composition is a polymerization initiator (a co-crosslinking agent), which substantially decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Various activators may also be included, such as, for example, zinc oxide and/or magnesium oxide. Both of these are activators for the polybutadiene.

Fatty acids or metallic salts of fatty acids may also be included in the compositions, functioning to improve moldability and processing. Generally, free fatty acids having from 2, preferably about 10 carbon atoms, and at most about 40, preferably at most about 20 carbon atoms, are used. Suitable fatty acids include stearic acid, linoleic acids, as well as mixtures thereof. An example of a suitable metallic salt of a fatty acid is zinc stearate.

Additional suitable and compatible modifying agents such as particulate polypropylene resin, fatty acids, and secondary additives such as pecan shell flour, barium sulfate, zinc oxide, and the like may be added to the polymeric resin compositions as necessary to provide support.

The curable component of the composition will be cured by heating the composition at elevated temperatures sufficient to cure the particular material as is readily determined by one of ordinary skill in the art relating to free radical curing agents for polymers.

A wide array of nylon-containing or nylon-based materials may be incorporated into the polymeric resin, along with different polymeric resin compositions with similar hardnesses. For example, one layer may be formed from an ionomeric resin of ethylene and methacrylic acid, while another is formed from an ionomer of ethylene and acrylic acid. One or more layers may contain polyamides or polyamide-nylon copolymers or intimate blends. Furthermore, polyurethanes, pebax, or thermosetting polyurethanes as described above can be used.

Other additives including dyes, optical brighteners, pigments such as titanium dioxide, zinc oxide, barium sulfate and zinc sulfate; UV absorbers; antioxidants; antistatic agents; and stabilizers may also be included. Moreover, the compositions may also contain softening agents such as plasticizers, metal stearates, processing acids, and the like, as long as the desired hardness and adhesive properties are not impaired. In addition, antioxidants, antistatic agents, stabilizers and processing aids along with reinforcing materials such as glass fibers and inorganic fillers may be added.

The badge may have a pre-painted coating placed thereon, and also may have a base coat, preferably a layer of acrylic color, and a clear coat, preferably an acrylic clear coat to protect the film from damage and to provide film elasticity, chemical resistance, stain resistance, weathering and UV protection. In another preferred embodiment, a urethane base coat, color coat and/or clear coat may be used either alone, or in combination with other suitable coatings.

Turning now to FIG. 1, a side view of a badge 2 is shown. The emblem 4 is attached to a mounting frame 6 having a generally planar mounting surface 8 formed from a plurality of ribs 14. The ribs 14 may be bent midway between the center point of the mounting surface and the distal end of the rib, so that a portion of the rib is positioned substantially perpendicular to the plane of the mounting surface 8 to form the plurality of tabs 10 in an outward orientation away from the plane of the mounting surface 8. The tabs 10 could also be formed by attaching an end piece to the rib rather than bending the rib. Emblem 4 is attached to mounting surface 8 by a polymeric resin 12. Also shown is a lip 26 located on the emblem. This lip 26 allows the emblem 4, when inverted, to form a bowl like container to hold an amount of polymeric resin. Accordingly, the emblem can be attached to the mounting frame by backfilling an inverted emblem 4 with polymeric resin 12 having a mounting frame disposed within the perimeter of the bowl like reservoir created by lip 26. Curing of the backfilled polymeric resin 12 (e.g., by heating) results in the emblem 4 being adhered to mounting frame 6 to form a single badge unit 2.

Figure 2:
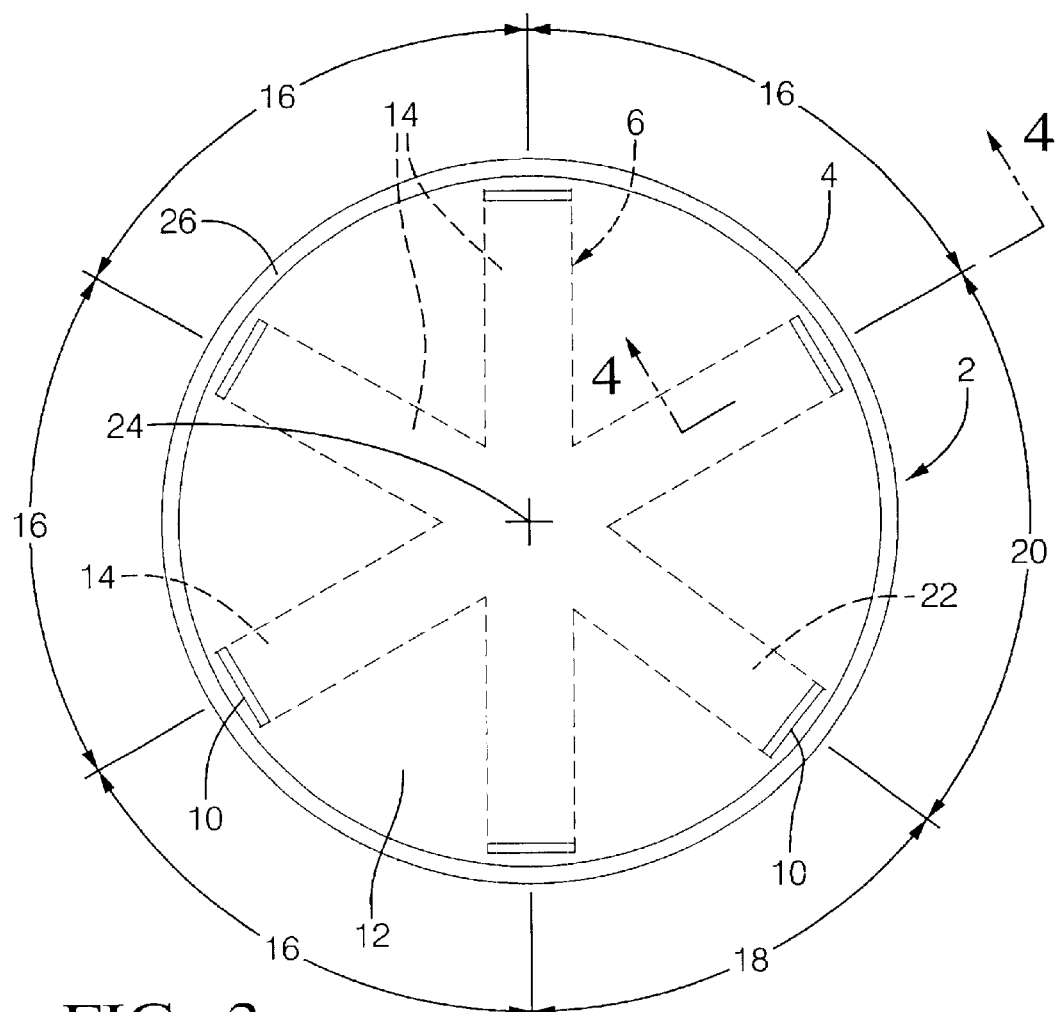
FIG. 2 is a bottom view of the badge shown in FIG. 1.

FIG. 2 shows a bottom view of mounting frame 6, wherein the ribs 14 can be seen extending from a center point 24, and the tabs 10 are oriented substantially perpendicular to the plane of the mounting surface 8, extending normal to the plane of the drawing. In one embodiment, using 6 ribs, the radial first spacing 16 between the tabs is substantially equal (e.g., about 120° on center when 6 ribs are present), except between the indexing tab 22 as depicted by a second spacing 18 (e.g., less than about 120° on center when 6 ribs are used) and a third spacing 20 (e.g., greater than about 120° on center when 6 ribs are used). Of course other rib arrangements are contemplated herein if less or more ribs are used. Also shown is the attachment of mounting frame plate 6 to an underside of emblem 4 using the above described adhesive polymeric resin 12.

Figure 3:
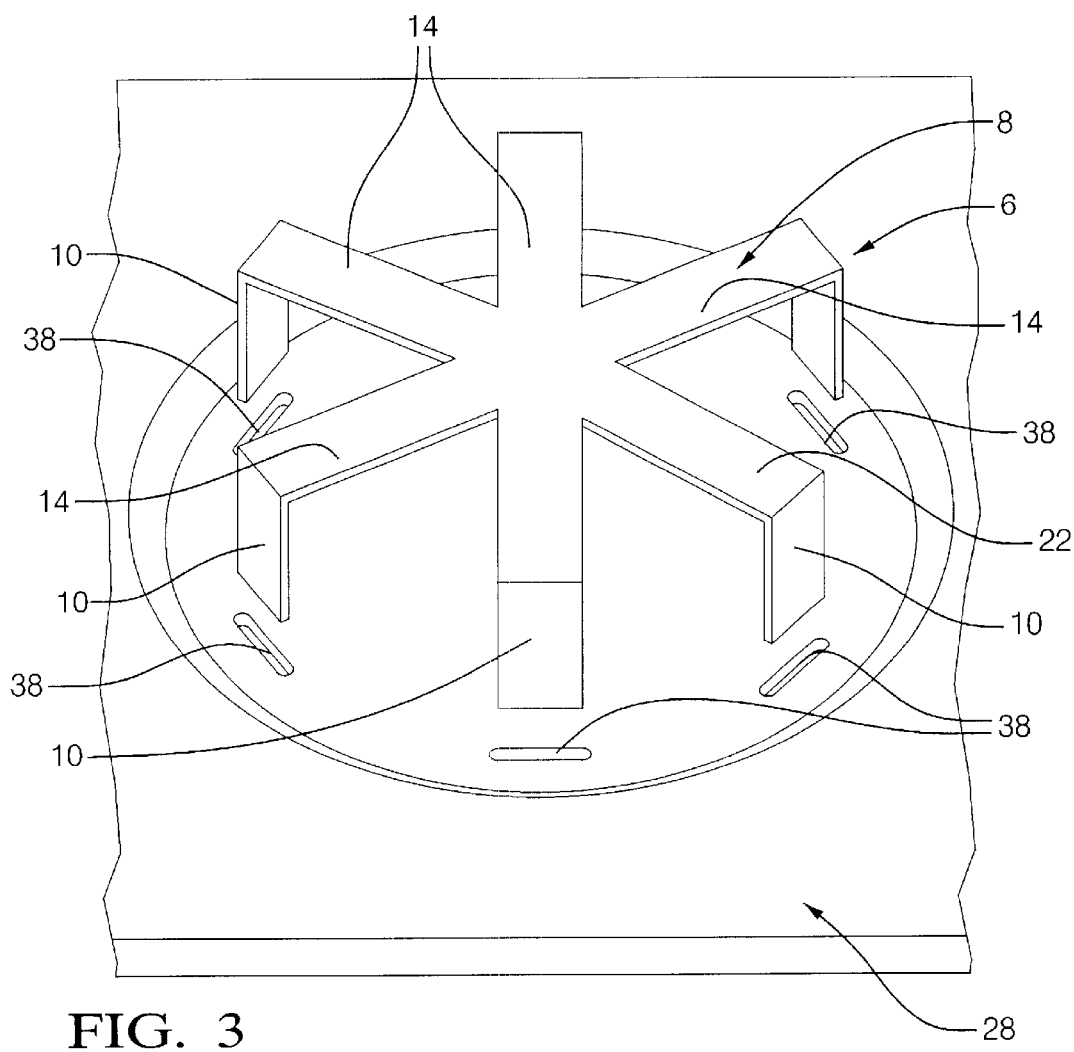
FIG. 3 is a expanded view of a mounting frame of FIG. 1 with the emblem removed positioned above a substrate.

FIG. 3 is an expanded view of a mounting frame 6 positioned above a substrate 28. For clarity, the emblem is not shown. The tabs 10 are positioned to correspond to slots or apertures 38 located in a substrate 28 to which the finished badge will be attached. Ribs 14 form a substantially planar mounting surface 8 to which an emblem may be attached using an adhesive polymeric resin. Typically the emblem is attached to the frame before the badge is mounted on the substrate.

Figure 4:
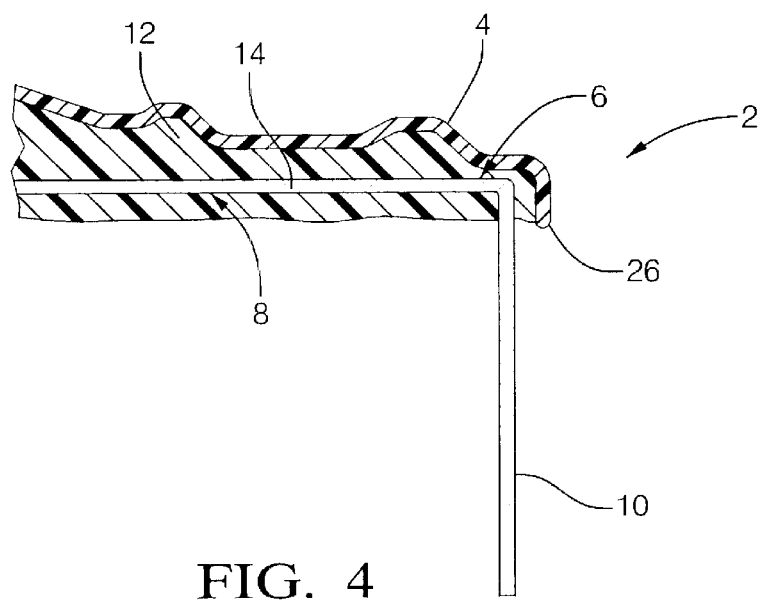
FIG. 4 is a partial cross section depicting the badge of FIG. 1.

FIG. 4 is a partial side view depicting an embodiment of the badge described herein. As shown in the figure, mounting frame 6 is attached to emblem 4 at mounting surface 8 using an adhesive polymeric resin 12. Lip 26 contains an adhesive polymeric resin 12, and conceals the mounting frame 6 from sight when attached to a substrate in use. Tab 10 extends outward from the substantially planar mounting surface 8 and is formed by forming ribs 14 as described above. In this embodiment, adhesive polymeric resin 12 at least partially surrounds ribs 14 of mounting frame 6 and by filing the contours of emblem 4, also provides support of the emblem.

FIG. 5 illustrates attaching or affixing badge 2 to a substrate 28. At least one tab 10, and preferably a plurality of tabs 10 are bent and or crimped 32 against a rear surface 30 of substrate 28. In this preferred embodiment, tabs 10 are bent against a crimp wall 34, and badge 2 is located in a recessed portion 36 of the substrate. The tabs 10 being positioned on the badge 2 to protrude through slots 38 in substrate 28. Bent tabs 10 press against the rear surface of recessed portion 36 to create a substantially constant load on substrate 28. In reaction to this load, the elastomeric material of substrate 28 exerts an opposing biasing force (spring-like force), which allows badge 2 to be secured to substrate 28. Preferably, tabs 10 are bent inwardly toward a center of recessed portion 36 as in FIG. 5, which takes up less space on the rear surface of recessed portion 36, and also allows badge 2 to aid in creating a greater biasing force exerted by the elastomeric material due to the sandwich effect of badge 2 and tabs 10.

FIG. 6 illustrates a mounting frame 6 having a mounting surface 8 formed from an ABS plastic disk, along with a plurality of heat-stake posts 40 extending substantially perpendicular to the plane of the badge to form the plurality of posts in an outward orientation away from the mounting surface 8. Badge 4 is attached to mounting frame 6 by a polymeric resin 12. Also shown is a lip 26, which allows for the polymeric resin 12 to be filled into the reservoir created within the area beneath the inverted badge 4.

FIG. 7 illustrates a badge (not shown) attached to a substrate 28, with heat stake posts that have been heated and deformed 42 to provide physical attachment between the two. A back up plate can also be positioned over the bosses before they are melted to give extra holding strength. This back up plate may be formed from metals including aluminum and steel, and/or be formed from molded plastic.

As described above, the emblem may be attached (bonded) to the mounting surface by backfilling an inverted emblem with a layer of the polymeric resin with a mounting frame disposed within the emblem either before or after addition of the resin, followed by curing the polymeric resin to form an adhesive force between the emblem and the mounting frame. In addition, an adhesive may be applied to the mounting frame to locate the emblem thereon and the two mated through application of external pressure prior to addition of the resin. Curing the polymeric resin may be at room temperature and/or at elevated temperature, but preferably includes heating the polymeric resin at a temperature suitable to induce curing, preferably less than about 150° C.

EXAMPLES

Example 1

Metal Tab Mounting Frame

An emblem for use with a badge described herein was produced by using an electroforming process. The emblem was first cleaned to remove any foreign material and to assure proper adhesion. Next, an adhesive was applied to the mating surface of the mounting frame, which was then positioned within the reservoir created upon inverting the emblem. The two were mated together using an externally applied force. A pourable urethane resin was mixed with a curing agent and carbon black for use as a pigment. The resin was poured into the reservoir created by the inverted emblem and containing the mounting frame. The resin was allowed to cure at room temperature. Once cured, the resin had a Shore D hardness of 30.

The mounting frame tabs were then inserted into predetermined holes in an airbag cover substrate. Once the product was properly seated, the tabs were crimped against the crimp-wall of the substrate.

Example 2

ABS plastic Heat Stake Mounting Frame

An electroformed emblem identical to the one used above was cleaned and then inverted as described above. An adhesive was applied to the mounting surface of an ABS plastic mounting frame having heat stake posts, which was then positioned within the reservoir created by the inverted emblem. The two were secured together using an applied external force. A pourable urethane resin was mixed with a curing agent and carbon black was used as a pigment. The resin was then poured into the reservoir created by the inverted emblem and containing the mounting frame. The resin was allowed to cure at room temperature. Once cured, the resin had a Shore D hardness of 30.

The heat stake posts were then inserted into predetermined holes in an airbag cover substrate. Once the product was properly seated, heat stake bosses were used to melt the heat stake posts into a prearranged shape using a hot thermal stake technique to secure the badge to the assembly The polymeric resin used in Examples 1 and 2 is operable in a temperature range of about +80° C. to about −30° C. The polymeric resin having a Shore D hardness within the specified range has greater adhesive properties than polymeric resins outside this range.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A badge comprising a metallic emblem, adhesively attached to a mounting frame by a polymeric resin, wherein said mounting frame comprises a single piece of metal or metal alloy.

2. The badge of claim 1, wherein said emblem comprises at least one metal.

3. The badge of claim 2, further comprising said emblem being formed by a dry film formation process.

4. The badge of claim 3, wherein said dry film formation process is vacuum metal deposition, ion plating, sputtering, ion cluster beam deposition, chemical vapor deposition, or a combination comprising at least one of the foregoing.

5. The badge of claim 4, wherein said dry film formation process is sputtering.

6. The badge of claim 4, wherein said emblem comprises nickel.

7. The badge of claim 1, wherein said emblem has a thickness about 0.2 to about 0.5 mm.

8. The badge of claim 1, wherein said emblem comprises at least one metal layer.

9. The badge of claim 1, wherein said emblem further comprises an outer lip to form a concave reservoir within said emblem.

10. The badge of claim 1, wherein said single piece of metal includes aluminum.

11. The badge of claim 1, wherein said mounting frame comprises a substantially planar mounting surface formed from a plurality of ribs connected to a plurality of tabs, and wherein said emblem is attached to at least a portion of said mounting surface.

12. The badge of claim 11, wherein said mounting frame comprises a plurality of ribs extending radially outward from a center point to form said mounting surface, and wherein each of said ribs terminates in an outwardly oriented angled portion substantially normal to the plane of said mounting surface to form said tabs.

13. The badge of claim 1, further comprising at least one indexing tab, wherein said at least one indexing tab is positioned between two adjacent tabs such that a distance between a first adjacent tab and said indexing tab is greater than a distance between a second adjacent tab and said indexing tab.

14. The badge of claim 1, wherein said polymeric resin is an elastomeric resin, a thermoplastic resin, a thermoset resin, or a combination comprising at least one of the foregoing.

15. The badge of claim 14, wherein said polymeric resin is a solid, a liquid, a gel, a foam, or a combination comprising at least one of the foregoing.

16. The badge of claim 14, wherein said polymeric resin includes an elastomeric rosin selected from the group consisting of: acrylates, butyls, chlorosulfonated polyothylenes, fluorocarbons, fluorosilicones, polysulfides, polyurethanes, neoprenes, nitriles, silicones, styrene-butadiencs, and combinations comprising at least one of the foregoing.

17. The badge of claim 14, wherein said polymeric resin includes a thermoplastic resin selected from the group consisting of: acetates, acrylics, cellulosies, chlorinated polyethers, fluorocarbons, polyamides, polycarbonates, polyethylencs, polypropylenes, polyimides, polyphenylene oxides, polystyrenes, polysulfones, vinyls, and combinations comprising at least one of the foregoing.

18. The badge of claim 14, wherein said polymeric resin includes a thermoset resin selected from the group consisting of: alkyds, diallyl phthalates, epoxies, melamines, phenolics, polyesters, urethanes, silicones, and combinations comprising at least one of the foregoing.

19. The badge of claim 14, wherein said polymeric resin comprises a thermoset urethane.

20. The badge of claim 19, wherein said thermoset urethane includes a polyester based liquid isocyanates-terminated pro-polymer cured with 4,4'-methylene-bis (orthochloroaniline).

21. The badge as in claim 1, wherein said metallic emblem has a thickness of about 0.01 mm to about 1 mm and said polymeric resin has a Shore D hardness of about 20 to about 90.

22. A badge comprising a metallic emblem, adhesively attached to a mounting frame a polymeric resin, wherein said mounting frame comprises a single piece of plastic resin.

23. The badge of claim 22, wherein said plastic resin includes ABS plastic resin.

24. The badge of claim 22, wherein said mounting frame comprises a substatially planar mounting surface formed from a shaped piece of plastic resin, and wherein said emblem is attached to at least a portion of said mounting surface.

25. The badge of claim 24, wherein said mounting frame comprises a plurality of heat-stake posts outwardly oriented substantially perpendicular to the plane of said mounting surface.

26. The badge of claim 25, further comprising at least one indexing post, wherein said at least one indexing post is positioned between two adjacent posts such that a distance between a First adjacent post and said indexing post is greater than a distance between a second adjacent post and said indexing post.

27. The badge as in claim 22, wherein said metallic emblem has a thickness of about 0.01 mm to about 1 mm and said polymeric resin has a Shore D hardness of about 20 to about 90.

28. A vehicular sub-assembly comprising:
a substrate; and
a badge attached to said substrate;
wherein said badge comprises;
a mounting frame; and
a metallic emblem, adhesively attached to said mound frame by a polymeric resin, wherein said mounting frame comprises a substantially planar mounting surface formed from a shaped piece of plastic resin, and wherein said emblem is attached to at least a portion of said mounting surface.

29. The sub-assembly of claim 28, wherein said substrate is an airbag cover.

30. The sub-assembly of claim 28, wherein said mounting frame comprises a substantially planar mounting surface formed from a plurality of ribs connected to a plurality of tabs, and wherein said emblem is attached to at least a portion of said mounting surface.

31. The sub-assembly of claim 30, wherein said badge is mechanically attached using said tabs that have been bent, crimped or mechanically shaped in, around, or through at least a portion of said substrate.

32. The sub-assembly of claim 28, wherein said mounting frame comprises a plurality of heat-slake posts outwardly oriented substantially perpendicular to the plane of said mounting surface.

33. The vehicular sub-assembly as in claim 28, wherein said metallic emblem has a thickness or about 0.01 mm to about 1 mm and said polymeric resin has a Shore D hardness of about 20 to about 90.

34. A method of producing a vehicular sub-assembly comprising:
adhesively attaching a metallic emblem to a mounting frame with a polymeric resin, to form a badge; and
attaching said badge to a substrate to form said vehicular sub-assembly, wherein said mounting frame comprises a substantially planar mounting surface formed from a shaped piece of plastic resin, and wherein said emblem is attached to at least a portion of said mounting surface.

35. The method of claim 34, wherein said substrate is an airbag cover.

36. The method of claim 34, wherein said mounting frame comprises a substantially planar mounting surface formed from a plurality of ribs connected to a plurality of tabs, and wherein said emblem is attached to at least a portion of said mounting surface.

37. The method of claim 36, wherein said mechanically attaching said badge is by crimping, bending, or mechanically shaping at least one of said tabs in, around, through or a combination thereof at least a portion of said substrate.

38. The method of claim 34, wherein said mounting frame comprises a plurality of heat-stake posts outwardly oriented substantially normal or perpendicular to the plane of said mounting surface.

39. The method of claim 38, wherein said attaching of said badge step comprises inching mid forming said heat-stake posts in, around, through or a combination thereof at least a portion of said substrate.

40. The method as in claim 34, wherein said metallic emblem has a thickness of about 0.01 mm to about 1 mm and said polymeric resin has a Shore D hardness of about 20 to about 90.

* * * * *